Patented July 5, 1927.

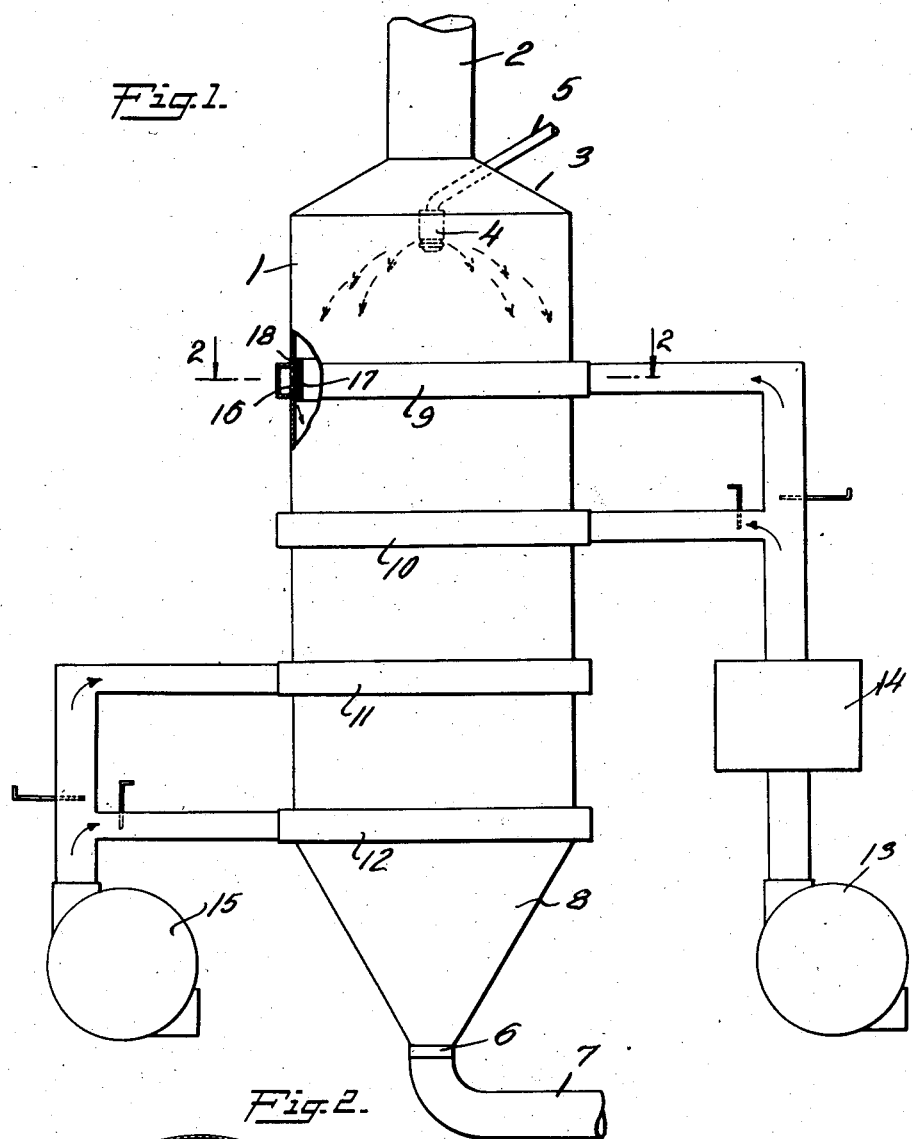
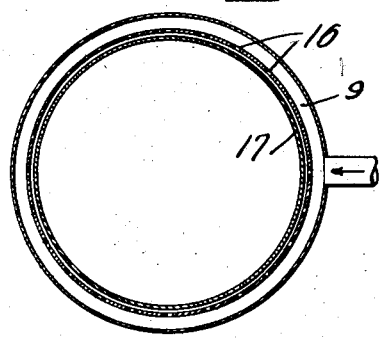

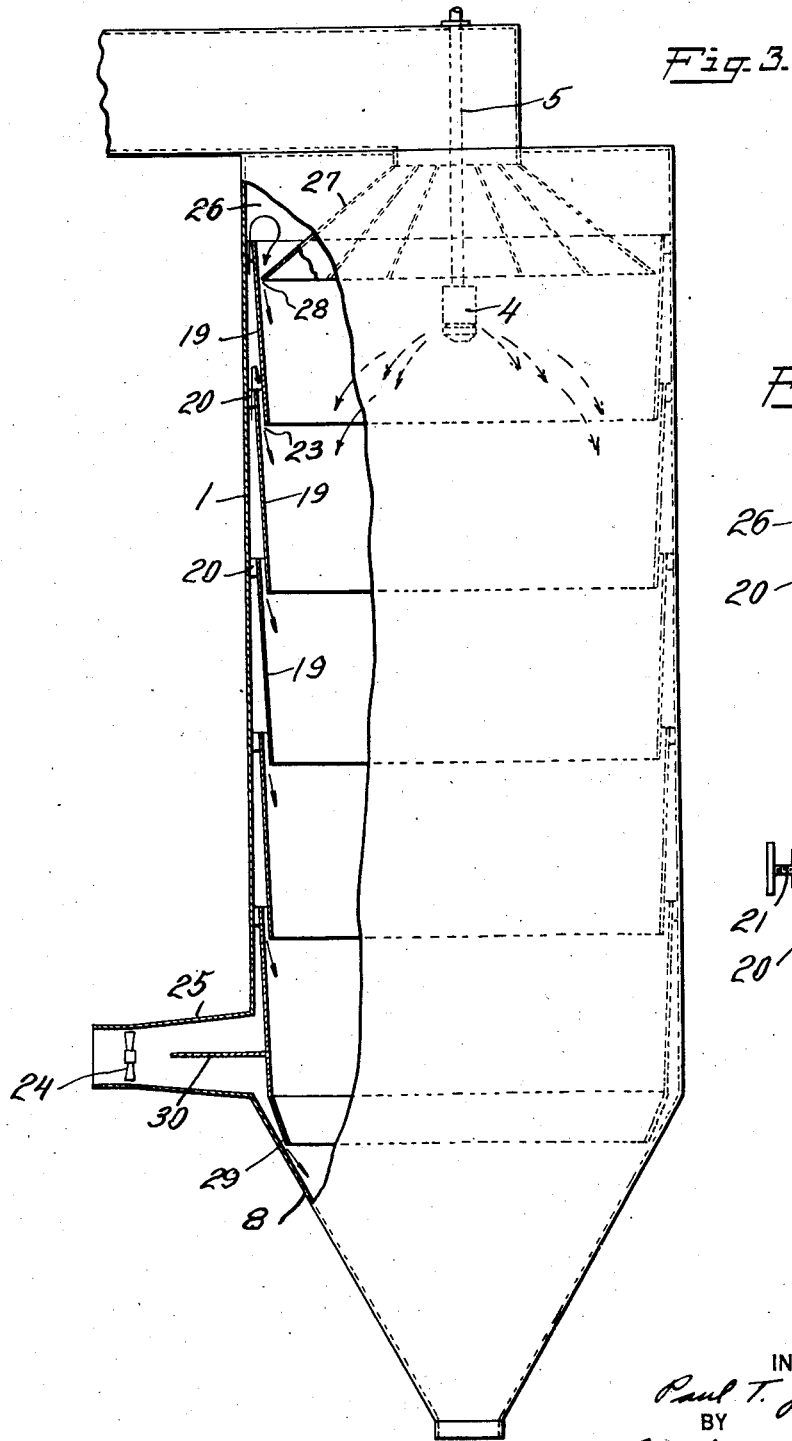

1,634,640

UNITED STATES PATENT OFFICE.

PAUL T. ZIZINIA, OF BELMAR, NEW JERSEY, ASSIGNOR TO INDUSTRIAL SPRAY-DRYING CORPORATION, OF NEW YORK, N. Y., A CORPORATION OF DELAWARE.

SPRAY PROCESSING APPARATUS.

Application filed September 20, 1926. Serial No. 136,713.

The present invention relates to the structure and operation of a tower or chamber used in the spray-processing of materials and has to do particularly with the control of the sprayed material in the tower so that it will proceed along the tower during its treatment in an orderly manner without contacting with and sticking to the walls of the tower.

Desiccation of liquid material, conversion of certain materials from one physical form to another, processing of materials to effect certain reactions, and the like, may be accomplished by preparing the material in liquid form, spraying or disintegrating the liquid material into finely divided condition and exposing it to the action of an appropriate gaseous medium, subjecting the sprayed material while in suspension in the gaseous medium to appropriate conditions of temperature, partial vapor pressure, and the like, for a proper length of time and then separating out the treated material and removing it from the influence of the treating gas. The success of such processes of treating materials depends upon the carrying of each particle of the material being treated in suspension in the treating gas so that it is subjected to the necessary conditions of the process while in isolated condition out of contact with the parts of the apparatus and upon passing all of the particles of the material being treated through the apparatus in like manner of flow so that all particles receive a substantially identical treatment and so that, when the apparatus is in continuous operation, all of the particles are in substantially the same degree of treatment at any given transverse section of the tower. In attaining these conditions and thus providing an operative process which insures the production of a uniform product and which is adaptable to carrying out different processes and operations on different materials, a process wherein a concurrent flow of the treating gas and the sprayed material is maintained has certain definite advantages. In such a process the particles of the finely divided material under treatment are introduced into the initial portion of the current of treating gas. The particles of the product are positively propelled through the apparatus by the current of treating gas so that all of the particles remain in the apparatus for substantially the same length of time and are therefore subjected to substantially identical treatment with the result that a uniform product is obtained.

The present invention has to do particularly with the control of the flow of the particles under treatment through the apparatus in order to attain as closely as possible the conditions above noted, namely, the passage of the various particles through the apparatus in identical manner to thereby subject all particles to identical treatment and the passage of the particles through the apparatus without contact with the walls. The present invention is particularly adaptable for use in processes where a concurrent and preferably downward flow of the treating gas and material being treated is employed, but it is of value when employed with other types of processes as well.

Specifically, it is an object of the present invention to prevent objectionable contact of the material being treated with the walls of the treating chamber or tower and to positively propel forward the particles nearing the walls to thus keep them definitely moving along through the apparatus in the proper direction. In the normal operation of a spray treating process, as for instance a spray-drying process for the recovery in dry powder form of the normally solid constituents of a liquid material, the drying chamber or tower becomes filled with the particles of liquid and the resulting dry solid particles, together with the partially dried particles in the intermediate stages of the process. These particles are thickly suspended in the treating gas throughout the entire drying chamber, and even where a good control of the flow through the drying chamber is obtained and where whirling and eddying is reduced to a minimum there is a considerable amount of contacting of the particles of material with the tower walls. Where conditions of flow in the drying chamber are not the best, as for instance where cross currents, eddying and the like are present to a considerable degree, this condition of particles contacting with the walls of the apparatus is present to a much greater degree. The result is that the particles of material being treated stick to the walls of the drying chamber or tower, and the material builds up on the walls in the form of cakes or large integral masses which must be scraped off or which eventually fall from the walls under their own weight and appear as objectionable matter in the product coming from the apparatus. In certain instances the building up and falling off of these cakes blocks the entire discharge opening from the apparatus and necessitates a complete shutdown and cleaning out of the apparatus before operation can be continued. In the drying of syrupy materials, for example, malt extract, molasses and the like, this condition of sticking and caking is particularly bad. The walls of the tower are hot, and the particles of sticky syrupy material readily adhere to the walls at the slightest contact. The product which sticks to the walls is burned and is thus rendered unfit for use. Not only does this action interfere with the operation of the apparatus and contaminate the product with unfit material but actually materially reduces the output of the apparatus and causes a substantial loss of material. These difficulties arising out of contact of the material with the walls of the treating chamber is a very serious commercial objection in the spray treatment of many substances and in many instances renders the successful spray treatment of materials either not feasible or totally impossible.

The present invention serves to pass the particles of material under treatment through the tower in an orderly manner without objectionable contact and sticking of the particles to the tower walls, and it accomplishes this result by providing adjacent the inner walls of the drying chamber a circumferentially continuous sheet of gas moving at an appropriate velocity along the walls and acting principally to prevent particles of material passing through it and reaching the walls. This protective sheet of gas adjacent the walls may be quite thin. It is essential that the sheet be continuous around the periphery of the drying chamber as distinguished from a broken air body as would, for instance, be created by a succession of jets or nozzles spaced about the periphery of the apparatus. It is also essential that the protective air sheet be generated in such manner as to extend over substantially the entire length of the drying tower, at least throughout all of that portion of the length of the tower which contains particles of material in such condition that they would be injured or would stick if they were to contact with the tower walls. The air sheet moves in the same direction as does the principal body of material passing through the tower and moves at a reasonably high velocity. The velocity of the air sheet should be sufficiently high so that when a particle approaches the tower wall it is entrained in the moving sheet of air and is thus deflected from its course toward the wall into a course substantially parallel with the wall. As the moving air constituting the protective air sheet proceeds along the tower its velocity diminishes, and it gradually expands out into the tower and is absorbed in the normal flow of gas through the apparatus. The sheet is renewed at such intervals as may be desirable to render its action effective throughout the desired length of the tower. The air sheet also exerts a certain scouring action on the walls of the apparatus so that if any particles momentarily touch the walls the moving air sheet will tend to blow them off again immediately before they become burned and stuck to the wall. A particle approaching the wall is caught up in the moving air sheet and deflected into a direction substantially parallel with the wall so that if it should contact with the wall it will have but slight tendency to stick and will be positively brushed off the wall and propelled along by the moving air current. The protective air sheet moves preferably in the same direction of flow as does the principal current of treating gas passing through the apparatus, and in the concurrent flow process the directions of flow of the principal current of treating gas, of the material being treated and of the protective air sheet are identical.

This difficulty of sticking of the product in spray-drying and like apparatus has been encountered as long as such apparatus has been in use on a commercial scale, and various means have been proposed to eliminate it. It has been proposed to conduct the operation in a large size tower with the spray nozzle or nozzles located near the center of the tower. With a big tower less sticking of the product to the sides of the tower is encountered, but such a device is not in a true sense a remedy but rather is a somewhat cumbersome and expensive expedient which is helpful chiefly in instances where an abnormally large tower is used for a given output. Another proposal which to a certain extent restricts sticking of the product to the walls of the chamber is the admission of the heated drying air at a plurality of points spaced around the drying chamber and also at different points along the height of the chamber. With such an arrangement sticking of the product to the walls of the chamber is avoided in the immediate vicinity of the air inlet openings, but much of the inner surface of the drying chamber is not protected by the air issuing from the inlet openings. A further difficulty is that the provision of a plurality of inlet openings spaced about the tower ordinarily produces cross currents and a generally confused flow in the tower which in turn causes increased contact and increased sticking of the particles to the walls. It has also been proposed to prevent contact of the wet spray at the initial end of the drying chamber with the walls of the chamber by so admitting drying air to the initial end of the drying chamber that it proceeds down along the walls of the tower and thus has a tendency to ward off any particles which may come into proximity with the walls. Such an arrangement is of material value in preventing objectionable contact of the material with the walls of the drying chamber in the vicinity of the spray, but we have found that with this arrangement it is practically impossible to extend the influence of the protective air current to any substantial distance along the length of the tower. The result is that, while the initial end of the tower is kept reasonably free from matter accummulating on the walls, the middle and final length of the tower are affected by sticking of the product to substantially the same extent as in ordinary operation when the tower is operated without regard to the elimination of this difficulty. In horizontal drying chambers it has been proposed to admit the drying air at a plurality of points along the bottom of the chamber directed obliquely upwardly and along the length of the chamber to thus keep the material off the bottom and keep it moving along through the chamber. In such apparatus the admitted air not only serves to evaporate and absorb the moisture content of the liquid material being treated but also exerts a lifting action on the particles of material to counteract the influence of gravity which tends to deposit the material at the bottom of the chamber. In vertical drying towers it has also been proposed to admit all or a part of the drying air through nozzles directed along the walls of the drying chamber and, in some instances, through flattened or elongated nozzles designed to eject a flattened stream of air which scours a certain area of the inner walls of the tower. This arrangement is usually resorted to in drying chambers of square or rectangular cross section along the middle portions of the flat faces of the chamber for the reason that in square chambers most of the sticking occurs at these points rather than in the corners which are further removed from the spray nozzles. This arrangement has been operated reasonably satisfactorily with materials which do not have a pronounced tendency to stick, as for instance heavy inorganic materials and certain organic materials such as milk, and the like, which are relatively easy to handle. As far as we are aware none of the arrangements heretofore proposed will eliminate or minimize sticking to the inner walls of the drying chamber with materials which are difficult to handle, as for instance syrups, molasses, sugar, etc., to such an extent that the injury to the product, the losses in the product by burning and caking, and the difficulties in the operation of the apparatus arising out of the caking and dropping off of the caked portions of material, together with the resulting contamination of the product, are negligible. The present invention reduces the difficulties above noted to a negligible minimum and in addition provides other advantages such as regulating the flow of the particles through the apparatus to facilitate uniform treatment of the particles, and the like.

A further important advantage of the present invention is the tempering of the inner walls of the drying chamber. The gas employed in generating the protective film or sheet flowing adjacent the inner walls of the drying chamber is ordinarily, in the spray-drying processes, not the heated drying air but is cooler air drawn from the exterior of the apparatus. The continuous contact of this cooler air with the inner walls of the drying chamber serves to cool the walls and in so doing avoids the burning of the particles of material which would otherwise occur upon even a brief contact with the hot walls. The cooling of the walls also reduces the tendency of the material to stick. This is particularly true in the case of sticky substances such as syrups. For instance, if a particle of a sprayed syrupy material contacts with the hot wall the moisture in that portion of the drop which touches the wall immediately evaporates and the particle sticks tightly to the wall. When the walls are cool, however, it is entirely possible for the particles to touch the walls lightly and to be brushed off without sticking for the reason that there is no rapid evaporation of the moisture from that portion of the particle which contacts with the wall. Also, with cooling of the inner walls of the tower a lesser amount of heat is conducted through the walls and lost to atmosphere than is the case where the inner walls are very hot.

The accompanying drawings illustrate various forms of spray-processing apparatus embodying the present invention. In the drawings, Figure 1 is a vertical elevational view, partly in section, illustrating a spray processing apparatus embodying the present invention; Figure 2 is a horizontal sectional view taken on line 2—2 of Figure 1; Figure 3 is a vertical sectional view of a modified form of spray processing apparatus embodying the present invention; and Figure 4 is a partial sectional view illustrating a structural detail of the apparatus of Figure 3.

Referring to the drawings, 1 indicates the spray-treating chamber here shown as a vertically positioned cylindrical tower. The treating gas, as for instance heated drying air, is supplied to the main chamber or tower 1 through an inlet duct 2 which opens into the top of the tower and is widened out to the diameter of the tower through the medium of an intermediate portion 3 of generally conical shape. The material to be treated is delivered into the initial portion of the current of treating gas by means of an appropriate spray or distributing nozzle 4 supplied with material through line 5 which leads from a storage reservoir or other suitable source of supply for the material being treated. The entire contents of the tower including the spent treating gas, together with the treated material which is carried in suspension in the gas, are discharged from the tower through the discharge opening 6 at the bottom of the apparatus and are conveyed through discharge duct 7 to appropriate separating and collecting means for recovering the treated material and discharging the spent treating gas to waste. The cone portion 8 at the bottom of the tower serves as a directing funnel for converging the matter issuing from the tower into the discharge duct 7. As the material being treated issues from the spray nozzle 4 in finely divided condition it becomes entrained in the downwardly flowing current of treating gas and is positively propelled down along the length of the tower 1 in suspension in the gas. With this concurrent downflow type of process, wherein the particles of material being treated are positively propelled through the apparatus in the normal direction of gravitational action, every particle remains in the treating chamber for substantially the same length of time, and thus a uniformly treated final product is assured. In a properly operating apparatus of this type all of the particles passing a given horizontal section of the tower, when the apparatus is in stable continuous operation, will be in substantially the same stage of treatment. Similarly the treatment of all of the particles of material passing through the tower will be completed at substantially the same point along the length of the tower.

In the tower shown in Figure 1 the moving protective sheets of air flowing along the inner walls of the tower are admitted at four points along the length of the tower through the medium of circular ducts 9, 10, 11 and 12, spaced at different heights and extending around the outer circumference of the tower. Ducts 9 and 10 are supplied with air by means of a fan 13 which draws atmospheric air at its intake side and passes the air through a conditioning apparatus 14 on its way to the ducts. Ducts 11 and 12 are here shown as supplied with air at atmospheric temperature delivered to them by fan 15. Thus the air used in preventing contact of the material being treated with the walls of the tower is not ordinarily a part of the normal supply of treating gas, such as for instance relatively highly heated drying air. In a spray-drying process, for instance, the air admitted to the tower through ducts 9 and 10 may be heated to any desired degree by means of heater 14, the temperature of this air usually ranging somewhere between atmospheric temperature and the temperature of the incoming principal body of drying air. In the spray-drying process the air admitted through ducts 11 and 12 may conveniently be at substantially atmospheric temperature so that a cooling effect on the dried product which prevents burning or similar injury to the product is obtained. The relatively cool air which is used to protect the tower walls serves to keep the walls cool and thus to minimize the danger of injury to a particle which comes in contact with the wall.

The air from the ducts passes into the tower 1 through the medium of holes or slots 16 extending through the tower wall and located peripherally about the tower so that they correspond in location to the circular ducts. At the inside of the tower a circular apron or sheet 17 extending in parallelism with the tower wall is placed directly over holes 16 and is spaced a short distance from the wall, say ⅛ of an inch, by means of members 18, interposed between the sheets 17 and the tower wall. The air supplied to the duct passes through holes 16 around the entire periphery of the tower and enters the narrow space between the tower wall and the sheet 17. Sheet 17 serves to deflect downwardly the stream of air entering from the duct and thus creates a thin, continuous moving sheet of air occuring in closed conformation around the entire inner circumference of the tower and proceeding downwardly along the length of the tower immediately adjacent the walls. The various inlet ducts are arranged sufficiently close together so that each successive protective sheet of air begins before the effect of the preceding sheet is exhausted. Any particle approaching near the tower wall is picked up by the moving protective sheet of air and is deflected out of its course toward the wall and is passed along down the length of the tower without contact with the wall.

The lowest inlet duct 12 is here shown at the top of the delivery cone 8. When the particles of the material being treated have reached the point in the tower at which duct 12 is located they are in substantially their final condition, and the tendency of the particles to stick upon the walls of the apparatus is normally less than at points higher in the tower. With many products, however, considerable difficulty with sticking on the cone 8 is encountered for the reason that in converging the stream of treating gas and the product suspended in it to the small diameter of the discharge opening 6 a considerable amount of actual contact of the particles of the material with the cone 8 necessarily occurs. The duct 12 in supplying a protective sheet of air moving down along the inner surface of the cone 8 provides an air cushion upon which the downflowing particles ride in such fashion that they are prevented from contacting with the walls of the cone and at the same time are given a definite impetus in the direction of the discharge opening 6. With this arrangement the cone is kept entirely clear of adhering material even with the most difficult products. This is in contrast to the conditions which frequently arise in the operation of the ordinary type of tower where the cone often fills up with sticking material to such an extent that the discharge opening 6 is completely blocked off, and a complete shut-down for cleaning out the cone is necessary.

The apparatus of Figure 3 is a type of vertical tower modified particularly in the manner of passing the protective air to the narrow openings which discharge it into the tower. The main shell or housing 1 of the tower constitutes its outer wall. Inside of the housing 1 are positioned a series of sheet metal rings 19 extending circumferentially about the tower and spaced a short distance away from the main tower wall 1. The spacing and positioning of these sheet metal rings 19 is somewhat exaggerated in the drawing for the purpose of more clearly illustrating the structure. Each sheet metal ring 19 is preferably constructed in say four sections for convenience in installing and manipulating. At its upper edge each ring 19 is supported and spaced from the wall 1 of the tower by means of a series of blocks 20 located at convenient intervals around the circumference of the tower. At its lower edge each of the sheets 19 has a connection with the tower wall 1 which, as shown in detail in Figure 4, consists of an adjusting rod 21 threaded through the tower wall and attached to the sheet 19 as indicated at 22. The lower extremity of sheet 19 overhangs the upper portion of the next lower sheet to form between the two sheets a narrow circumferential opening or slot 23. The width of this slot can be varied throughout an appropriate range by means of the adjusting rod 21. When the adjusting rod 21 is actuated it moves the lower portion of the sheet 19 by flexing the metal of the sheet to a certain extent. When each ring is built in four sections this adjustment may conveniently be made.

The air for furnishing the protective moving air sheets which prevent contact of the material with the inner walls of the tower is furnished by a fan which may be located at the bottom of the tower as indicated at 24. The fan 24 draws in atmospheric air and passes it through duct 25 into a relatively narrow space between the main tower wall 1 and the sheets 19 and thus creates a flow of air up along the inside of wall 1 throughout the entire length of the tower. A portion of this air issues through each of the circumferential slots 23, and the remainder of it issues into the upper portion of the tower through the final space 26 between the upper sheet 19 and the tower wall 1. Thus, at each air opening 23 a thin circumferentially continuous air sheet issues into the tower and proceeds downwardly along the inner face of the next lower sheet metal ring 10. The rings 10 are of such width that the air openings 23 occur sufficiently close together so that the effect of the air sheet issuing from one opening persists at least as far as the next lower opening. The air issuing from each successively higher opening 23 is warmer for the reason that it has flowed for a greater distance in contact with the metal parts of the apparatus. The air issuing from the upper opening 26 circulates around the outside of the hot air distributing element 27, thus attaining a reasonably high temperature, and from thence proceeds through the narrow circumferential opening 28 at the outer edge of the distributing element 27 so that it furnishes a protective air sheet passing down along the inner surface of the top ring 19. The lowermost ring 19 in the tower is positioned with its lower extremity lying adjacent the cone 8 so that the air issuing from behind this ring at 29 serves to protect and keep clean the inner surface of the cone. If desired, a baffle element 30 may be provided in the duct at the discharge side of the fan to aid in proportioning the relative amounts of air which proceed upwardly along the tower wall 1 and downwardly into the cone 8. The width of the openings 23 may be adjusted to such value as gives the best results with any particular product which is being treated.

The air circulated about the inside of the tower wall 1 and the outer faces of the sheets 19 serves to cool the metal parts of the tower and thus restricts heat losses by radiation from the outside of the tower. Practically all of the heat absorbed by the air passing up along the walls of the tower is effectively used in the process for the reason that it is introduced into the drying chamber at various points along the apparatus where it can be useful in the treatment of the material.

The present invention, therefore, provides for an orderly flow of the material being treated through the tower and thus makes for a uniform treatment of all of the particles of the material, with the result that a uniform product is obtained. It also provides for a flow of the material through the tower without contact with metal parts of the apparatus during treatment. It eliminates the usual difficulties of sticking and gumming of the material on the parts of the apparatus. The protective moving sheets of air which accomplish these results just noted also exert a scouring action on the walls and parts of the apparatus which blows off any small amount of material which may contact with the walls and tend to stick. The currents of protective air also cool the walls and thus minimize the tendency of the material to burn and to stick in case of contact with the walls. So also, excessive heat radiation losses from the tower are prevented without necessity of insulating the outside of the tower. The system further permits of control of the conditions within the tower by introducing at various points along the length of the tower air conditioned in temperature and amount as may be desired.

I claim:

1. Spray processing apparatus of the class described which comprises a chamber within which the treatment of the material takes place, means for propelling a current of treating gas through said chamber, means for introducing the material being treated into the said current of treating gas in finely divided condition, and means for establishing adjacent the inner walls of the treating chamber a separate current of gas extending in the form of a relatively thin sheet continuously about the periphery of the said chamber and persisting definitely throughout substantially the entire length of said chamber, whereby objectionable contact of the material being treated with the walls of the chamber is avoided throughout the entire chamber 2. Spray processing apparatus of the class described which comprises a treating chamber, means for passing a current of treating gas through said chamber, means for introducing the material being treated into the current of treating gas in finely divided condition, means for generating adjacent the inner walls of the treating chamber a moving sheet of gas extending in continuous closed conformation around the entire periphery of the chamber and moving through the chamber, and means for renewing the moving sheet of gas as it proceeds through the chamber to thereby extend said sheet in well defined form throughout any desired part of the extent of said chamber 3. Spray processing apparatus of the class described which comprises a treating chamber, means for passing a current of treating gas through said chamber, means for introducing the material being treated into the current of treating gas in finely divided condition, and means for introducing into the chamber at a plurality of points along the length thereof separate gas currents assuming the form of relatively thin moving sheets extending continuously around the inner periphery of the chamber directed along the walls of said chamber and spaced along the chamber at such intervals that each successive sheet begins before the effect of the preceding sheet is exhausted, whereby the entire inner surface of the chamber is saved from objectionable contact with the material under treatment 4. Spray processing apparatus of the class described which comprises a chamber within which the treatment of the material takes place, means for passing a current of heated treating gas through said chamber, means for introducing the said material into the current of treating gas in finely divided condition, and means for directing along the inner walls of the said chamber a separate current of gas of temperature less than that of the incoming heated gas, whereby said walls are cooled and contact of the material being treated with the walls is restricted.

5. Spray processing apparatus of the class described for treating materials in liquid form which comprises a treating chamber, means for passing a current of heated treating gas through said chamber, means for spraying the said liquid material into the current of heated gas in finely divided condition, means for introducing along the inner walls of the chamber at a plurality of points along the length of the chamber sheets of relatively cool air moving at a velocity sufficiently high to deflect particles of material being treated which move into proximity with said walls to thereby prevent contact of the said material with the walls, said sheets extending continuously around the inner periphery of the treating chamber and being spaced so that the sheets over-lap and thus cool and save the entire inner surface of the chamber from objectionable contact with the material being treated.

6. Spray drying apparatus for liquid materials which comprises a drying chamber, means for producing a positive flow of heated drying gas through said chamber, means for spraying the liquid material to be treated in finely divided condition into the initial portion of the current of drying gas traversing the said chamber, the particles of the sprayed material being carried along by the current of drying gas in a like direction of flow, a discharge opening in said chamber for the exit of the said drying gas, and means for establishing intermediate the point at which the liquid material enters and the said discharge opening a separate current of gas extending in the form of a relatively thin sheet about the entire inner peripheray of the chamber and proceeding along the walls of said chamber in like direction of flow with the principal current of drying gas, whereby the particles of the sprayed material pass through said chamber in an orderly uniform manner out of contact with metal surfaces.

7. Spray drying apparatus for liquid materials which comprises a drying chamber, means for producing a positive flow of heated drying gas through said chamber, means for spraying the liquid material to be treated in finely divided condition into the initial portion of the current of drying gas traversing the said chamber, the particles of the sprayed material being carried along by the current of drying gas in a like direction of flow, a discharge opening in said chamber for the exit of the said drying gas, and means for introducing into the drying chamber at a plurality of points along the length thereof a succession of relatively thin sheets of air extending continuously around the inner periphery of the chamber, directed along the walls of the chamber in the same direction as that of the principal current of drying gas and of successively decreasing temperatures.

8. Spray processing apparatus for the treatment of liquid matrials which comprises a treating chamber, means for producing a positive flow of treating gas through said chamber, a distributer acting upon the incoming treating gas to distribute it uniformly across the chamber and pass it along through the chamber in an orderly flow substantially uniform across the section of the chamber and relatively free from whirling and eddying, means for introducing the material being treated into said current of treating gas after it leaves the distributer, the particles of the sprayed material being carried along by the current of treating gas in like direction of flow, and means for introducing into the drying chamber at a plurality of points along the length thereof a succession of relatively thin sheets of air extending continuously around the inner periphery of the chamber, directed along the said walls of the chamber in the same direction of flow as that of the principal current of drying gas and spaced along the chamber at such intervals that each successive sheet begins before the effect of the preceding sheet is exhausted, whereby the entire inner surface of the drying chamber is saved from objectionable contact with the material under treatment and an orderly uniform flow of the material being treated is established.

9. Spray drying apparatus for converting the normally solid constituents of liquid materials into dry powder form, which comprises a drying chamber, means for producing a positive flow of heated drying gas through said chamber, means for spraying the liquid material to be treated in finely divided condition into the initial portion of the current of drying gas traversing the said chamber, the particles of the sprayed material being carried along during the drying thereof by the current of drying gas in a like direction of flow, a discharge opening in said chamber for the discharge of the resulting dry powder product, a converging portion connecting the main body of the drying chamber with the said discharge opening and serving to direct the powder product to the said opening, and means for directing along the inner surface of said converging portion a moving sheet of gas of velocity appropriate to prevent contact and sticking of solid material to the said surface.

10. Spray drying apparatus of the class described which comprises a drying chamber, means for passing a current of drying gas through said chamber, means for introducing liquid material in finely divided condition into the initial portion of the said current of drying gas, the particles of the sprayed material being carried along during evaporation of the moisture thereof by the current of drying gas in like direction of flow, a discharge opening in said drying chamber permitting the escape of the said drying gas, a converging portion connecting the main body of the drying chamber with the said discharge opening and serving to direct the spent drying gas and the dry powder product to the said opening, means for establishing at various points along the length of the drying chamber and said converging portion moving sheets of gas extending in continuous closed conformation around the inner surfaces of said parts and moving along said surfaces in like direction of flow with the principal current of drying gas and material being treated, whereby objectionable contact of the material being treated with the parts of the apparatus is avoided throughout the entire length of the apparatus.

11. Spray processing apparatus of the class described which comprises a chamber within which the treatment of the material takes place, means for propelling a current of treating gas through said chamber, means for introducing the said material into the said current of treating gas in finely divided condition, and means for establishing adjacent the inner walls of the treating chamber a separate current of gas extending continuously in the form of a relatively thin sheet about the periphery of the said chamber to thereby restrict contact of the material being treated with the walls of the drying chamber, and means for regulating the thickness of the said sheet of gas.

In testimony whereof I affix my signature.

PAUL T. ZIZINIA.